UNITED STATES PATENT OFFICE.

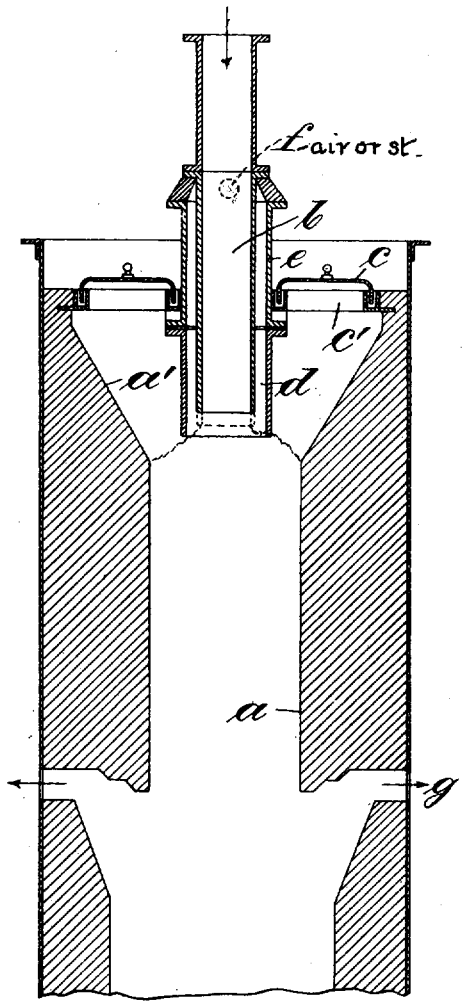

EDUARD BRAUSS, OF LINDEN, NEAR HANOVER, GERMANY, ASSIGNOR TO GEBR. KÖRTING AKTIEN-GESELLSCHAFT, OF KÖRTINGSDORF, NEAR HANOVER, GERMANY.

GAS-GENERATOR.

974,639.   Specification of Letters Patent.   Patented Nov. 1, 1910.

Application filed August 3, 1909. Serial No. 511,016.

*To all whom it may concern:*

Be it known that I, EDUARD BRAUSS, a subject of the King of Prussia, German Emperor, and resident of Linden, near Hanover, in the German Empire, have invented certain new and useful Improvements in Gas-Generators, of which the following is a specification.

This invention relates to gas generators in which coal or the like to be distilled is introduced from above and the present invention has particular reference to the method of introducing air or steam or a mixture of air and steam into the layer of fuel or material to be distilled. In known generators of this kind it has been proposed to introduce the air or steam or mixture of air and steam by means of a fluid inlet opening through the generator wall into the space surrounding the filling hopper or funnel. This arrangement however has the disadvantage that the entire material was not subjected to the action of the fluid introduced and thereby the center part of the material caked into hard blocks while only the material in the neighborhood of the walls of the generator was distilled. This had the further disadvantage that the caked material arranged in the center of the generator shaft prevented the feeding of fresh material into the generator. In those cases where the fluid was fed to the generator through a pipe opening within the fuel feeding hopper the material in the center of the generator was efficiently distilled but the material near the walls became caked so that no fluid could pass therethrough.

The object of the present invention is to avoid these difficulties which lead to interruptions in the action of the generator.

According to the present invention the entire material in the generator is efficiently and uniformly subjected to the action of the air or mixture of air and steam. This action is obtained by providing means for supplying the fluid in a downwardly directed stream immediately around the fuel filling funnel or hopper.

The invention is illustrated in one suitable form in the accompanying drawing which is a section through a generator.

Fuel is fed to the generator $a$ through a funnel $b$ and the gas generated finds its outlet by the openings $g$. Around the funnel $b$ there is arranged a pipe $e$ which leaves a space $d$ between the funnel $b$ and its own inner surface. Into this space there is supplied steam, air, or a mixture of air and steam through a fluid supply opening $f$. The end of the pipe $e$ is situated lower than the end of the feeding-funnel $b$. The pipe $e$ may be very conveniently arranged to terminate in the plane of its intersection with the sloping surface of the fuel passing from the pipe or fuel $b$. The generator is shown as widened at its upper end $a'$ and the pipes $b$ and $e$ terminate in this widened part. The pipe $e$ however is of less cross section than the narrow part of the generator $a$. The upper end of the generator is closed by a cover having openings $c'$ which are closed by removable doors $c$. In this way the attendant may readily remove one of the doors $c$ and by means of suitable rods break up any clinker which may tend to form. The formation of clinker however is practically prevented by the efficient distribution of the fluid through the material to be distilled.

I claim:—

1. A gas generator having in combination a generator chamber, a passage for the material to be treated extending downwardly into said chamber, a passage for the blast surrounding said passage for the material to be treated extending downward to substantially the level of the stack of material in said chamber and terminating in a passage of less outer diameter than the diameter of said stack and outlets for withdrawing gas near the lower part of said chamber.

2. Gas generator having in combination, a generator chamber widened at its upper end, a fuel supply funnel at the upper end of said generator and terminating in said widened part, a gas exit near the lower end of said generator, a fluid supply pipe around said fuel supply funnel and terminating below the same, said fluid-supply pipe being of less area than the narrower part of the generator.

3. Gas generator having in combination, a generator chamber widened at its upper end, a fuel supply funnel at the upper end of said generator and terminating in said widened part, a gas exit near the lower end of said generator, a fluid supply pipe around said fuel supply funnel and terminating below the same, said fluid-supply pipe being of less area than the narrower part of the generator, and a cover for the upper widened end of said generator, said cover having openings therein and removable doors closing said openings, for the purpose set forth.

In witness whereof I have hereunto set my hand in the presence of two witnesses.

EDUARD BRAUSS.

Witnesses:
 JOH. EBERDING,
 FRANZ TIGGES.